United States Patent [19]

Ambroise

[11] 4,125,205

[45] Nov. 14, 1978

[54] APPARATUSES FOR DISTRIBUTING HOT COOKED DISHES AND INSTALLATIONS EQUIPPED THEREWITH

[76] Inventor: Marc A. Ambroise, Villa Monté Grosso - Montée du Mont d'Or, 13015 - Marseille, France

[21] Appl. No.: 759,544

[22] Filed: Jan. 14, 1977

[30] Foreign Application Priority Data

Jan. 16, 1976 [FR] France ................................ 76 01928

[51] Int. Cl.[2] ........................ A47J 27/14; G07F 11/00

[52] U.S. Cl. ........................................ 221/129; 53/240; 53/244; 99/357; 99/443 R; 221/150 HC

[58] Field of Search ............ 221/150 HC, 150 A, 129; 99/327, 357, 443 R, 443 C; 53/240, 244

[56] References Cited

U.S. PATENT DOCUMENTS

| | | | |
|---|---|---|---|
| 3,224,643 | 12/1965 | White | 221/150 A |
| 3,354,813 | 11/1967 | Meyer et al. | 99/336 |
| 3,386,550 | 6/1968 | Murray et al. | 99/357 X |
| 3,397,817 | 8/1968 | Smith | 221/150 HC |
| 3,653,541 | 4/1972 | Crum | 221/150 HC |

*Primary Examiner*—Robert B. Reeves
*Assistant Examiner*—Francis J. Bartuska

[57] ABSTRACT

An apparatus for dispensing cooked dishes is disclosed which includes a refrigerated isothermal cabinet in which cooked dishes are kept. The cabinet has an outlet opening for the dishes and an automatic door selectively opening and closing the opening in the cabinet. A first conveyor is located within the cabinet and has one end emerging from the outlet opening thereof. At least one microwave induction oven is positioned adjacent the conveyor for receiving cooked dishes emerging from the cabinet and reheating the cooked dishes.

13 Claims, 6 Drawing Figures

Fig.3
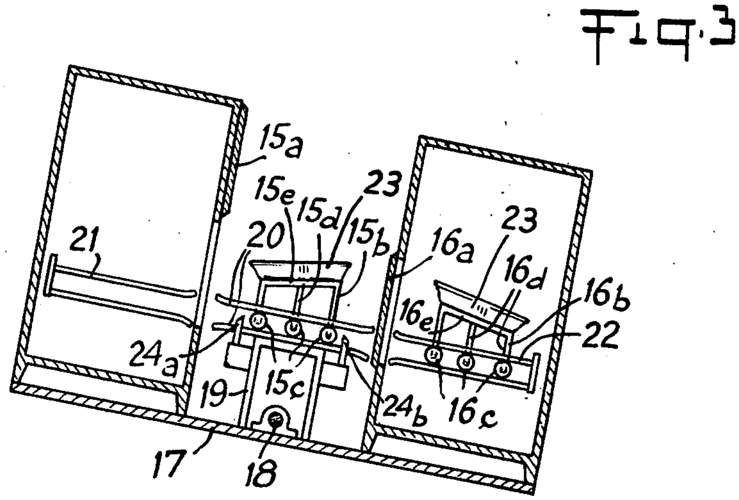
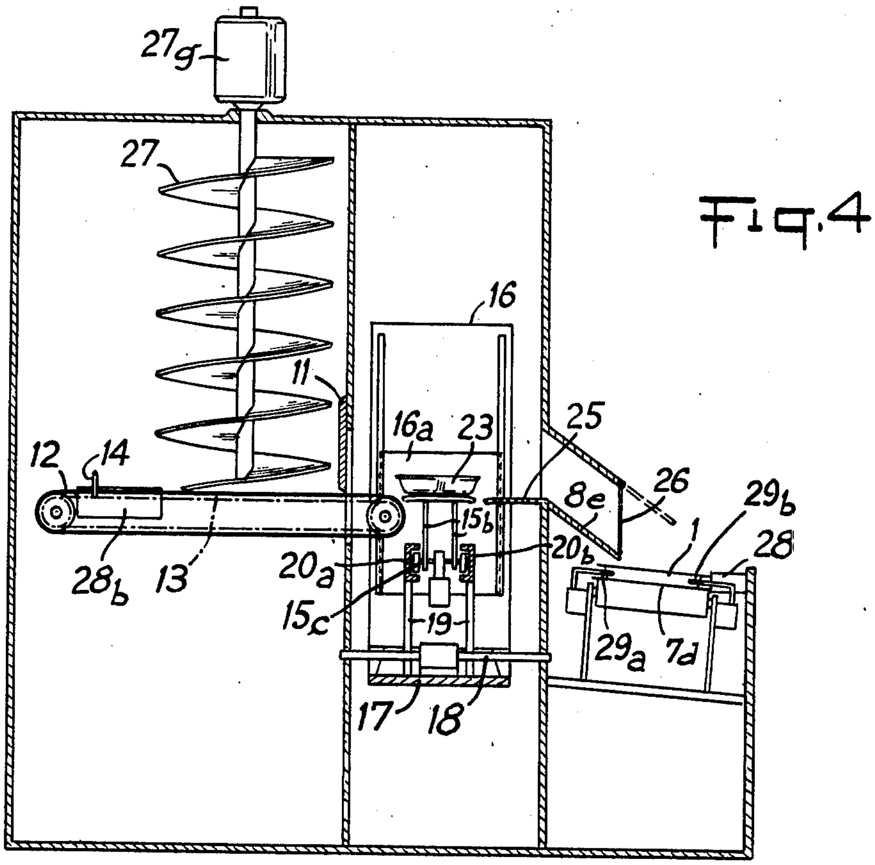
Fig.4

Fig. 6
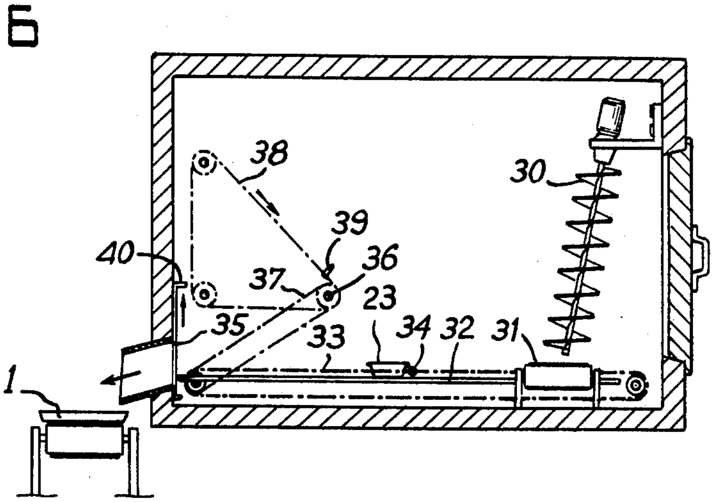
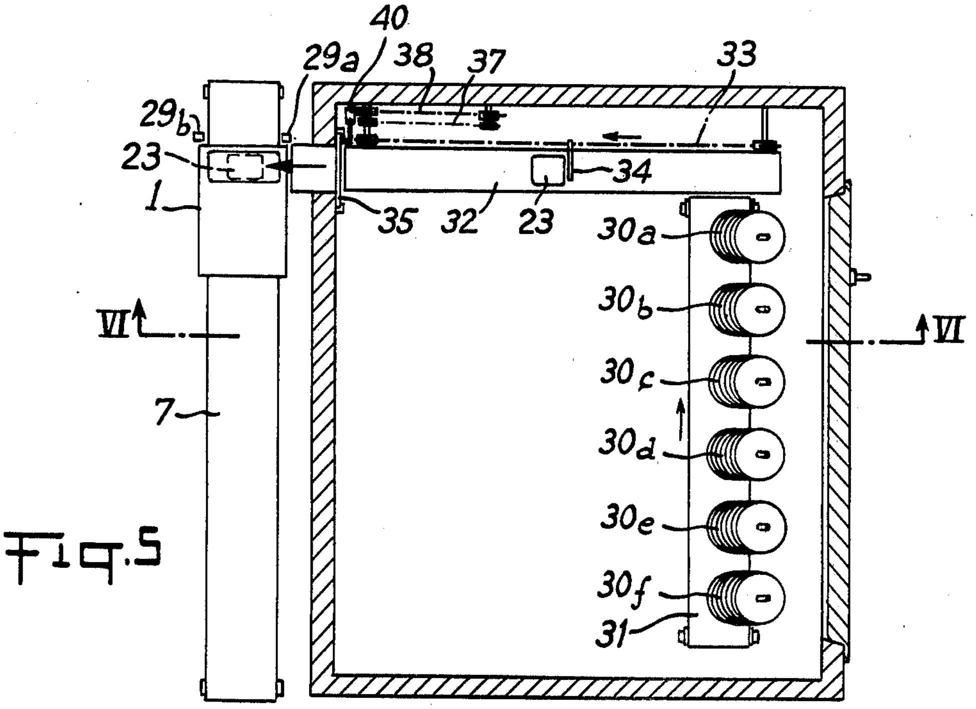
Fig. 5

APPARATUSES FOR DISTRIBUTING HOT COOKED DISHES AND INSTALLATIONS EQUIPPED THEREWITH

The invention relates to apparatuses for dispensing hot cooked dishes and to meal-dispensing installations equipped with such dispensing equipment.

Several types of isothermal cabinets for dispensing hot cooked dishes are known.

A first type consists of refrigerated cabinets comprising electrical sockets into each of which a tray equipped with a compartment heated by electrical resistance may be plugged. The cold cooked dish is placed in this compartment and is kept cold. A timing device closes the circuits supplying the heating resistance before the meal.

A second type consists of isothermal cabinets containing only trays of cold cooked dishes, all of which are heated simultaneously before being dispensed hot.

One aspect of the present invention is to provide hot cooked-dish dispensers which make it possible to choose between several kinds of cooked dishes, to keep the cooked dishes in a refrigerated atmosphere for several days, and to reheat only the selected dishes at the moment of selection.

It is another aspect of the invention to provide hot cooked-dish dispensers which make it possible to reheat the selected dishes very quickly, thus allowing the said dispensers to be incorporated into installations dispensing complete meals comprising at least one hot cooked dish, without slowing the rate at which the said meals are dispensed.

Ovens known as micro-wave ovens are known. These ovens emit very high frequency electromagnetic waves which make it possible to heat up a cooked dish, in a few tenths of a second, from a food-preserving temperature of slightly above 0° C. to a temperature of the order of 60° to 70° C.

Difficult problems arise in incorporating these ovens into dispensers of selected dishes.

Another aspect of the invention is to provide devices for handling automatically the dishes in the micro-wave ovens fitted with sliding doors. This allows these known furnaces to be combined with refrigerated cabinets for the purpose of obtaining a means of dispensing hot cooked dishes selected from dishes of various types kept in refrigerated cabinets.

The foregoing aspects of the invention are realized by means of an apparatus for dispensing hot cooked dishes, the said apparatus comprising:

a refrigerated isothermal cabinet in which the cooked dishes are kept, the said cabinet having an outlet for the said dishes which is fitted with an automatic door; a first conveyor which is located within the said cabinet and emerges therefrom through the said outlet; and at least one micro-wave induction oven which receives the cooked dishes emerging from the said cabinet and reheats them.

The present invention also relates to an installation for automatically dispensing various selected foods and beverages, constituting a complete meal, to a compartmented tray, the said installation comprising:

a row of dispensers arranged side by side and each containing several varieties of an item on the menu, among which there is at least on hot cooked-dish dispenser; a longitudinal conveyor, consisting of one or more sections, which extends along the said row of dispensers and carries the said compartmented tray; retractable stops spaced at intervals along the said conveyor and opposite each dispenser, the said stops halting the tray at points where the various compartments in the tray are located consecutively under the dispenser outlet spouts; and, for each dispenser, a push-button console which allows the customer to select one of the various items on the menu contained in each dispenser.

The invention thus provides new products consisting, on the one hand, of automatic dispensing of hot cooked dishes and on the other hand, of installations for the automatic dispensing of complete meals, known as automatic "snacks" which comprise such dispensers and which allow customers using them to make up, at will, meals comprising one hot dish selected from several such dishes.

The dispensers of hot dishes according to the invention have the advantage of preserving the cooked dishes in refrigerated cabinets until a customer requires such a dish. This eliminates any danger of deterioration of a prepared dish which is not eaten on the same day, and greatly facilitates the administration of such dispensers and keeping them supplied.

The micro-wave ovens into which the cooked dishes to be reheated are placed are known units.

The originality of the invention is to be perceived in that it combines these ovens with a refrigerated cabinet and a conveyor which feeds the said ovens automatically.

Known ovens are fitted with motor-driven sliding doors which makes them difficult to feed automatically.

The present invention makes it possible to solve this problem by equipping the apparatus with a roller track which is at right angles to the conveyoı emerging from the refrigerated cabinet, which extends into the interior of the ovens with an interruption upon passing through the door, the carriages entering the said ovens either moving along the said roller track by gravity, or being propelled therealong.

The carriages are fitted with wheels or rollers, for example, which roll on the said tracks, the latter being in the form of rails or grooves. The said tracks may, however, be replaced by any other equivalent means.

Incorporating a dispenser according to the invention in a complete installation makes it possible to obtain automatic units for dispensing complete meals, comprising one or more hot dishes, on compartmented trays, the said meals being selected by the customer according to his taste.

If such installations are to be economically feasible, they must be able to supply several hundred meals per hour at peak hours, which amounts to supplying one hot dish about every 10 seconds.

An installation according to the invention, comprising two ovens which reheat in turn the dishes emerging from the refrigerated cabinet while the customer passes along the dispensing line, so that the dishes are already hot when the customer reaches the hot-dish outlet, makes it possible to eliminate any loss of time.

One application for installations according to the invention is in community canteens, snack bars, and camp-sites. This makes it possible for a caterer operating a plurality of kitchens to stock up a plurality of units with dishes prepared ahead of time. This results in a marked decrease in equipment investment, in that it eliminates kitchens and service personnel.

The following description relates to the drawings attached hereto which represent examples of embodiment of the invention, but in no way restrict it. In the said drawings:

FIGS. 3 and 4 are sections along the lines III—III and IV—IV in FIG. 2;

FIG. 5 is a diagrammatic plan view of a cold food dispenser for an installation according to FIG. 1; and FIG. 6 is a vertical section along the line VI—VI in FIG. 5.

FIG. 1 illustrates diagrammatically, and in plan view, a general layout of a complete installation for dispensing meals automatically into compartmented trays 1.

Figure 1:
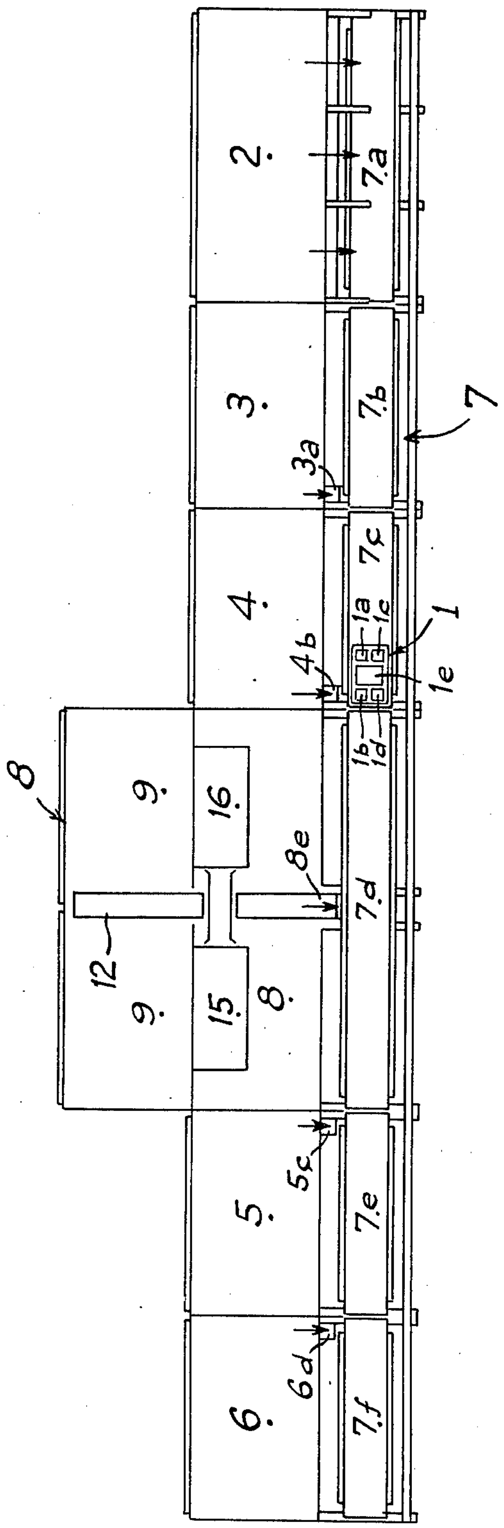
FIG. 1 represents diagrammatically, and in plan view a general layout of a complete installation for dispensing meals automatically according to the invention.

This installation comprises essentially:

a tray dispenser 2 placed at the head of the line;

a row 3, 4, 5, 6 of dispensers of fresh foods or beverages.

Each dispenser corresponds to one item on the menu; for example, dispenser 3 carries a hors d'oeuvre, dispenser 4 a cheese, dispenser 5 a dessert, and dispenser 6 a beverage. Each dispenser contains several varieties of the item on the menu, which the customer may select by means of a console, not shown, which is located either in front of the dispenser or anywhere along the line, the said console comprising a plurality of push-buttons allowing the customer to select one of the varieties of hors d'oeuvre, dessert, beverage, etc.

Located in the installation, in front of the dispensers, is a longitudinal conveyor 7 comprising a plurality of adjacent sections *7a, 7b, 7c, 7d, 7e, 7f.* These sections may be in the form of endless belts, or they may be chain conveyors, scraper conveyors, chute conveyors, slide conveyors, or the like.

Trays 1 are located by dispenser 2 upon conveyor 1, and thus move along the row of dispensers, halting in front of each one. Each dispenser comprises an outlet spout 3*a*, 4*b*, 5*c*, 6*d*, and tray 1 has compartments 1*a*, 1*b*, 1*c*, 1*d* which are located under one of the spouts when the tray is halted in front of a dispenser. In FIG. 1, for example, tray 1 has stopped under spout 4*b* of dispenser 4, so that compartment 1*b* receives that of the cheeses contained in dispenser 4 which has been selected.

An installation according to the invention also comprises a dispenser 8 of hot cooked dishes, equipped with an outlet spout 8*e* which places a hot cooked dish in compartment 1*e* in the tray, when the latter stops opposite dispenser 8. Dispenser 8 contains, in its trays, a plurality of cooked dishes prepared in advance. The customer may thus choose between several cooked dishes and thus make himself a meal containing one dish of his choice.

It is to be understood that an installation according to the invention could have a plurality of cooked-dish dispensers, if it were desired to dispense meals consisting of several hot dishes, or to offer the customers a larger choice.

Figure 2:
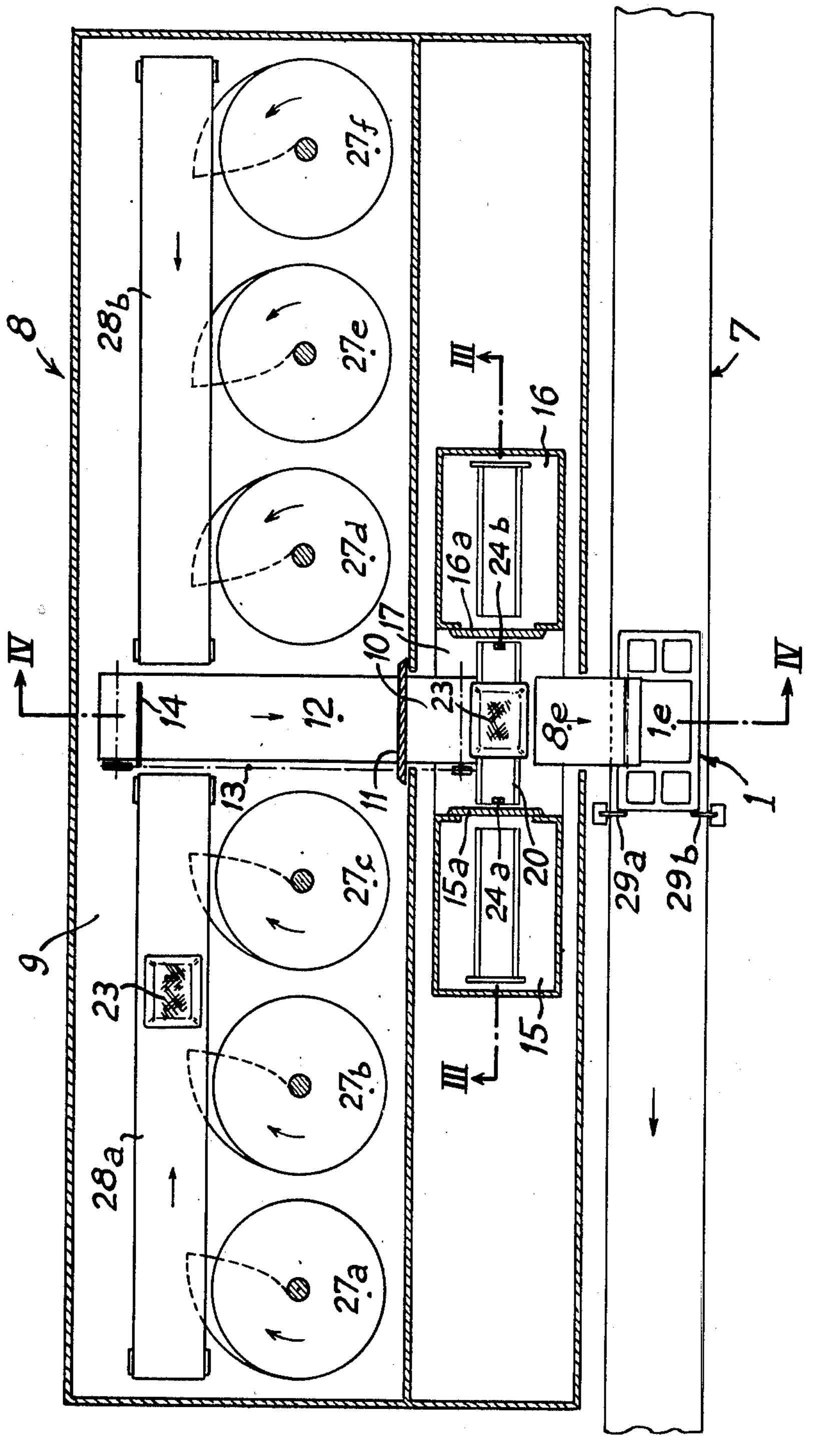
FIG. 2 is a plan view, to an enlarged scale of the hot-dish dispenser in an installation according to claim 1.

FIGS. 2, 3 and 4 are more detailed views of dispenser 8.

Located at the back of this dispenser is a refrigerated isothermal cabinet 9 in which the prepared dishes are kept cold, for instance, at a food-preserving temperature. This cabinet has an outlet 10 equipped with a motor-driven door 11 and a conveyor 12 which emerges from the cabinet through the said outlet. This conveyor may be, for example, an endless-chain conveyor 13 fitted with a finger 14 which pushes the trays of cooked dishes on a slide; or any other equivalent conveyor may be used.

The opening and closing movements of door 11 are synchronized with the movement of the conveyor, in such a manner that the door opens automatically when a tray approaches the door, allows the said tray to pass, and then closes.

Dispenser 8 contains two very high frequency inductions ovens, known as micro-wave ovens, 15, 16 located ahead of cabinet 9 on each side of the extension to conveyor 12. Each of these ovens is equipped with a sliding door 15*a*, 16*a*.

Ovens 15, 16 are supported by an arm 17 oscillating about an axis 18 parallel with the axis of conveyor 12. A motor-driven reduction gear, not shown, causes arm 17 to rock periodically. This arm carries, upon a frame 19, a roller track 20 which may be in the form of two parallel slides 20*a*, 20*b*, shown in FIG. 4, or in any other equivalent form, such as rails, tracks, chutes, etc. Roller track 20 is interrupted at sliding doors 15*a*, 16*a* and is extended, within each oven, by similar roller tracks 21, 22 in alignment with track 20. Each oven has a carriage 15*b*, 16*b* which receives the trays emerging from conveyor 12, carries them into the corresponding oven, and removes them as soon as they have been heated. These carriages have three axles equipped with wheels or rollers 15*c*, 16*c* which run on track 20. Uprights 15*d*, 16*d* on these axles support a platform 15*e*, 16*e* which is on a level with conveyor 12, and which is horizontal if the latter is horizontal. This platform receives the trays of cooked dishes 23.

Retractable stops 24*a*, 24*b* are spaced apart on roller track 20 at a distance greater than the longitudinal wheelbase of the said carriage.

Uprights 15*d*, 16*d* of each carriage are unequal in length, as may be gathered from FIG. 3, so that platforms 15*e*, 16*e* are horizontal, in spite of the slope of arm 17, when carriage 15*b* or 16*b* is on roller track 20. Thus tray 23, which is upon conveyor 12 and is pushed by finger 14, passes from this conveyor to the carriage and pushes the already heated tray located on the said carriage.

The apparatus comprises, among other things, a horizontal slide 25 located in the extension of conveyor 12. This slide is extended by sloping spout 8*e* which is closed by a swinging door 26.

Cabinet 9 contains a plurality of motor-driven devices 27*a*, 27*b*, 27*c*, 27*d*, 27*e* and 27*f*, for example. Each dispenser 27 contains a supply of cooked-dish trays 23 of the same kind, for example, one with ravioli, one with sauerkraut, etc.

These devices consist, for example, of worms or spirals mounted upon vertical axes and rotated by means of a motor 27*g*. Thus when one of the spirals is started, it executes a partial revolution and places a tray 23 upon a conveyor 28*a* or 28*b* which serves a row of dispensers and is at right angles to conveyor 12.

A selector console, not shown, containing as many switches as there are devices 27, makes it possible to actuate one of the motors driving a spiral and thus to select one of the cooked dishes in cabinet 9. This switch also sets in motion conveyors 28*a*, 28*b* and chain conveyor 13 which, in turn, controls the automatic opening of door 11.

The selector console corresponding to hot-dish dispenser 8, is preferably located at the head of conveyor 7, whereas the dispenser itself is located at the end of the chain, so that tray 23 which has been selected is handled and heated while plate 1 travels along the dispensing chain.

Dispenser 8 operates as follows:

As soon as a customer presses one of the buttons in the selector console at the end of the chain, the particular dispenser 27 containing the selected dish is set in motion and delivers a tray 23 to one of the conveyors 28*a* or 28*b* which automatically transports it to conveyor 12, where it is picked up by finger 14 and pushed towards the outlet, door 11 opening automatically to allow the said tray to pass. One of the ovens, for example, oven 15, is in the upper position, door 15*a* is open, and carriage 15*b* is on roller track 20, held in position by stop 24*b* which is extended. Carriage 15*b* carries a hot tray 23 which has emerged from oven 15. This hot tray is ejected, for example, by a chain conveyor or by any equivalent means of transfer, towards slide 25 whence it descends into spout 8*e* where it is kept waiting by door 26.

Chain conveyor 13 then transfers to carriage 15*b* the tray placed upon conveyor 12. As a variant, it may be the thrust of the tray placed upon conveyor 12 which pushes towards spout 8*e* the hot tray located upon carriage 15*b*, and which replaces it upon the said carriage.

A cyclic programmer then controls successively: the rocking of arm 17 which moves oven 15 to the lower position and furnace 16 to the higher position; the movement of carriage 15 by gravity into oven 15; the closing of door 15*a*, the starting up of oven 15; the extension of stop 24*a*; the retraction of stop 24*b*; the shutting down of oven 16; and the opening of door 16*a*, which allows carriage 16*b* to emerge from oven 16 by gravity, and to come to rest at stop 24*a*. At this time, oven 16 is in the upper position, ready to receive a new tray emerging from refrigerated cabinet 9, thus initiating a new half-cycle. Thus the dishes emerging from cabinet 9 are heated alternately either in oven 15 or in oven 16, and this makes it possible to double the capacity of the installation. If, for example, the time required to heat one dish in an oven is of the order of 20 seconds, the unit will produce one hot dish every 10 seconds, which gives a total capacity of the order of 300 meals/hour, allowing for handling time.

If a lower output is acceptable, only one oven need be used. In this case the output may be increased by placing two dispensers 8 in the same line so that one or the other feeds each plate alternately.

A description has been given of the case in which a hot-dish dispenser 8 is incorporated into a complete-meal dispensing chain, but a dispenser according to the invention may also be used as an independent dispenser which will deliver, a hot cooked dish, upon demand and automatically, when a token or coin is inserted into the unit.

FIG. 4 shows that conveyors 7*d*, carrying tray 1, have a slight slope in the transverse direction. The advantage of this is that tray 1 is located accurately against a lateral slide 28, and that the compartment in the said tray is accurately positioned at the desired location to receive the product emerging from successive spouts 3*a*, 4*b*, 8*e*, 5*c* and 6*d*.

Retractable stops 29*a*, 29*b* are arranged along conveyor 7 opposite each spout. If conveyor 7 is a belt conveyor, it operates permanently, and the tray is halted temporarily, for a period of 10 seconds for example, by the said stops.

The thrust of the plate against the stops actuates a micro-switch which automatically controls the operation of a motor-driven stocking device contained in the relevant dispenser, in a typical combination, and with a switch controlled by one of the push-buttons of the selector console associated with the said dispenser.

FIGS. 5 and 6 are diagrammatic illustrations, in plan view and in side elevation, of the interiors of the refrigerated isothermal cabinets of the installation, i.e., cabinet 9 or dispensers 3, 4, 5 and 6. Each cabinet contains a row of motor-driven stocking devices 30, in this case, six devices 30*a*, 30*b*, 30*c*, 30*d*, 30e, 30*f*, which are similar to devices 27 in cabinet 9, i.e., they are in the form of spirals arranged vertically or at a slight angle to the vertical. Each spiral contains the same kind of menu item, for example, the same kind of hors d'oeuvre or dessert.

These spirals are located above a conveyor 31, which may be a belt conveyor, and which is at right angles to a chain-type conveyor 32 at the side of which is located an endless chain 33 carrying a pusher finger 34. Conveyor 32 terminates in front of sliding door 35 fitted to the cabinet outlet. Arranged on the other side of this door is one of the sloping spouts 3*a*, 4*b*, 5*c* or 6*d* which bring products onto tray 1 which is halted upon conveyor 7 by stops 29*a*, 29*b*.

FIG. 6 illustrates diagrammatically the drive means synchronized with the equipment in the cabinet.

Each spiral 30 is driven by a motor-driven reduction gear controlled separately by one of six switches located on a selector console. As soon as any one of the six switches is closed, this starts up conveyor 31 and a motor-driven reduction gear, point 36 of which represents the output shaft. The latter also drives simultaneously, by means of a notched belt 37 and a train of gears or the like, an endless chain 33 and a second endless chain or belt 38 carrying a finger 39 cooperating with a driving dog 40 on door 35, for the purpose of raising the said door. When the door reaches the top of its travel, dog 40 escapes from finger 39 and the door closes again by gravity. The lengths and operating speeds of chains 33 and 39 are calculated to allow finger 39 to engage with dog 40 when tray 33 appears in front of the door.

It is to be understood that, without departing from the scope of the invention, it is possible to replace the constituent elements of the dispensers and of the unit described above with equivalent elements performing the same functions.

The foregoing description relates to an example in which hot-dish dispenser 8 is incorporated into an installation for dispensing complete meals.

However, the dispenser shown in FIGS. 2, 3 and 4 may also be used alone as an independent dispenser of hot dishes offering a choice. The invention protects this application also.

As a variant, hot-dish dispenser 8 may also be used in conjunction with a dispenser of compartmented trays already carrying foods other than hot dishes, and beverages, i.e., items from the menu which are taken cold. In this case, the trays are stocked in a refrigerated cabinet until the meal is served. Each customer receives first of all a tray containing the said cold items and beverages; this tray then moves to the hot-dish dispenser, and this allows the customer to choose the cooked dish from his menu.

In this case the two dispensers may be completely independent and the customer may take his tray from one to the other; or the said dispensers may be connected to a conveyor which may move the trays from the cold food and beverage dispenser to the dispenser of hot cooked dishes.

What is claimed is:

1. An apparatus for dispensing cooked dishes comprising, in combination:

a refrigerated isothermal cabinet in which cooked dishes are kept, said cabinet having an outlet opening for said dishes and automatic door means for selectively opening and closing said opening; a first conveyor located within the said cabinet and having one end emerging therefrom through said outlet opening;

and at least one microwave induction oven means for receiving the cooked dishes emerging from said cabinet and reheating them; said microwave oven means having an opening formed therein including motor driven sliding door means for selectively opening and closing said oven opening; a roller track located at right angles to said conveyor, said track being interrupted at the oven door, and having an extended roller track within the oven means; and a carriage which moves upon said roller track including an upper platform located on a level with said conveyor for receiving the cooked dishes emerging from the conveyor and transporting them into the oven; and outlet spout aligned with said conveyor and on a level with said carriage platform, said spout receiving and dispensing the hot dishes emerging from the oven and transported by the carriage; and a support arm oscillatably mounted about a horizontal axis parallel with said conveyor, and said at least one oven means being mounted on one end of said arm adjacent said conveyor, said arm supporting the part of the roller track located outside said oven means and means for causing said arm to rock periodically, so that said carriage moves by gravity upon said roller tracks; and means for opening and closing the oven door automatically and in synchronism with the rocking movements of said arm.

2. An apparatus according to claim 1 including means for selecting one of a number of cooked dishes, and said isothermal cabinet including a plurality of motor-driven means for storing cooked dishes, each of said storing means containing dishes of the same kind; and said cabinet also including at least one second conveyor, running at right angles to said first conveyor and serving all of said storing means, and selector means for controlling the starting and stopping of said motor-driven storing means and conveyors, as well as the automatic opening and closing of the cabinet door, whereby a cooked dish of the kind selected emerges from said cabinet and is transferred to a carriage feeding said oven means.

3. An apparatus according to claim 1 including two micro-wave oven means respectively mounted on opposite ends of said arm on opposite sides of said conveyor.

4. An apparatus according to claim 3 wherein each of said oven means includes a carriage, said carriages each include wheels running upon said roller tracks, the platform of each carriage being connected to said wheels by uprights unequal in length, whereby said platform is horizontal when the oscillating arm is in one of its two positions of equilibrium.

5. An apparatus according to claim 4 including means for selecting one of a number of cooked dishes, and said isothermal cabinet including a plurality of motor-driven means for storing cooked dishes, each of said storing means containing dishes of the same kind; and said cabinet also including at least one second conveyor, running at right angles to said first conveyor and serving all of said storing means, and selector means for controlling the starting and stopping of said motor-driven storing means and conveyors, as well as the automatic opening and closing of the cabinet door, whereby a cooked dish of the kind selected emerges from said cabinet and is transferred to a carriage feeding one of said oven means.

6. An apparatus as defined in claim 1 including at least one dispenser consisting of a refrigerated cabinet stocked with trays each containing items other than said cooked dishes.

7. An apparatus as defined in claim 4 including at least one dispenser consisting of a refrigerated cabinet stocked with trays each containing items other than said cooked dishes.

8. An apparatus for dispensing cooked dishes comprising, in combination:

a refrigerated isothermal cabinet in which cooked dishes are kept, said cabinet having an outlet opening for said dishes and automatic door means for selectively opening and closing said opening;

a first conveyor located within said cabinet and having one end emerging therefrom through said outlet opening;

and at least one microwave induction oven means for receiving the cooked dishes emerging from said cabinet and reheating them; and a row of dispenser means arranged side by side for selectively dispensing several varities of food items and being located adjacent to said isothermal cabinet; said dispenser means each including an outlet spout, a longitudinal conveyor extending along said row of dispensing means and isothermal cabinet and carrying a compartmented tray;

retractable stop means spaced at intervals along said longitudinal conveyor opposite each dispenser, for halting the tray at points where the various compartments in the tray are located consecutively under the dispenser outlet spouts;

and means for selecting one of the various items in each dispenser.

9. An apparatus according to claim 8, wherein said isothermal cabinet is located near the downstream end of the longitudinal conveyor and means at the upstream end of the longitudinal conveyor for allowing a person to select a cooked dish, the said cooked dish emerging from the isothermal cabinet and entering said oven means while the tray passes in front of other dispensing means whereby when the said tray arrives adjacent said isothermal cabinet the hot dish is placed upon said tray.

10. An apparatus according to claim 8 wherein said retractable stop means actuate micro-switches whenever a tray comes into contact with them, each micro-switch, in conjunction with the means for selecting one of the various items in each dispenser, automatically controlling the dispensing, into the tray, of an item contained in each dispenser when the tray is halted by the said retractable stops.

11. An apparatus according to claim 8 wherein the longitudinal conveyor comprises a belt conveyor having a slight transverse slope.

12. An apparatus according to claim 8 wherein each dispenser means consists of an isothermal cabinet containing:

a plurality of means for storing commodities comprising a row of motordriven worms, having substantially vertical axes and each containing a specific variety of an item to be dispensed;

a belt conveyor running under the row of worms;

and a chain conveyor, at right angles to the belt conveyor emerging from its associated dispenser means and dispensing the item through an outlet spout.

13. An apparatus according to claim 12, wherein the dispenser means each have an outlet opening therein associated with said outlet spout and a door vertically slidably mounted therein for selectively opening and closing the outlet opening; said chain conveyor including a finger which pushes a tray containing the items selected, and means for driving simultaneously a second endless chain carrying a finger which automatically raises the door of the dispensing means whenever a tray arrives in front of it.

* * * * *